US012477020B1

(12) United States Patent
Paiuk (10) Patent No.: US 12,477,020 B1
(45) Date of Patent: Nov. 18, 2025

(54) VIRTUAL CONFERENCING BASED ON GEOFENCES

(71) Applicant: Zoom Video Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 275 days.

(21) Appl. No.: 18/139,181

(22) Filed: Apr. 25, 2023

(51) Int. Cl.
*H04L 65/1093* (2022.01)
*H04L 12/18* (2006.01)
*H04L 67/52* (2022.01)

(52) U.S. Cl.
CPC ...... *H04L 65/1093* (2013.01); *H04L 12/1818* (2013.01); *H04L 67/52* (2022.05)

(58) Field of Classification Search
CPC .. H04L 65/1093; H04L 12/1818; H04L 67/52
See application file for complete search history.

(56) References Cited

U.S. PATENT DOCUMENTS

| 11,165,789 | B1* | 11/2021 | Smith | H04L 63/107 |
| 2016/0302034 | A1* | 10/2016 | Sophinos | H04W 4/021 |
| 2018/0189835 | A1* | 7/2018 | DeLuca | G06Q 30/0246 |

* cited by examiner

*Primary Examiner* — Michael A Keller
(74) *Attorney, Agent, or Firm* — Kilpatrick Townsend & Stockton, LLP (57) ABSTRACT

Example methods and systems are provided for virtual conferencing based on geofences. A virtual conference device hosts an event session for an event at a location. The virtual conference device is installed with a virtual conference application. The virtual conference device joins an event session for an event and accesses geofence data associated with a geofence for an area at the location of the event. The geofence data includes at least one rule associated with the event session within the geofence. The virtual conference device determines that the virtual conference device is within the geofence. The virtual conference device applies the at least one rule in response to determining that the virtual conference device is within the geofence.

20 Claims, 7 Drawing Sheets

VIRTUAL CONFERENCING BASED ON GEOFENCES

FIELD

The present application generally relates to virtual conferencing and more specifically relates to virtual conferencing based on geofences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of virtual conferencing based on geofences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Many places provide live virtual experiences of an event by streaming or recording for users who are not on site. But in some cases, streaming or recording at certain areas at an event location may not be permitted by the event host or not desirable by a user of the virtual conference device. For example, streaming in a private office area is not permitted because it may disclose certain confidential information. Streaming in a bathroom is not desired as it may intrude other people's privacy or expose the streaming person's own privacy. However, these places may still inadvertently show up in the streaming content and disclose confidential information, expose or invade personal privacy.

To provide adequate event streaming control, the present disclosure provides techniques for controlling virtual conferencing via geofences. For example, an event includes on-site activities and also provides virtual experiences for remote participants about the on-site activities. A virtual conference device may stream the on-site event to a remote user via a client application provided by the virtual conference provider. If the virtual conference device is within a geofence, or outside the geofence, for an area at the on-site event, rules associated with the geofence are triggered automatically to control the streaming.

An event host may set up multiple geofences at different areas to manage streaming and recording of an event. Some geofences are configured to allow video and audio streaming in the geofenced areas, some geofences are configured to prohibit video and audio streaming in the geofenced areas, and some geofences are configured to require permission for video and audio streaming in the geofenced areas. Each geofence includes corresponding settings for virtual conferencing within the geofence.

A geofence for an area can include a setting of prohibiting video and audio streaming within the geofence. When a virtual conference device enters the geofence, the virtual conference application installed on the virtual conference device executes the setting by disabling the camera and microphone of the virtual conference device. Another geofence for another area can include a setting of requesting permission for video and audio streaming within the geofence. When a virtual conference device enters the geofence, the video conference provider executes the setting to pop up a dialogue window on the virtual conference device. The user of the virtual conference device can provide certain required information to the virtual conference provider to request for permission. The virtual conference provider may grant or deny the request based on the criteria set by the event host. For instance, certain ticket numbers or names are authorized to stream within the geofence. When the user of the virtual conference device provides an authorized ticket number or name via the dialogue window, the virtual conference device is then permitted to access camera and microphone.

The settings for virtual conference devices within a geofence also include backgrounds or sound effects for video or audio streaming. For example, if a virtual conference device is allowed to access camera and microphone within the geofence, the virtual conference provider may provide an background image or certain music, that matches the theme of the event within the geofence, to the video or audio streams. In another example, streaming is prohibited in the geofence. While the camera and microphone on the virtual conference device are disabled without necessarily cutting out the streaming, a preset image or video clip can be displayed in the video stream instead of the event.

Besides, the virtual conference provider may generate a notification when a client device is approaching certain areas. The notification can be one setting of the geofence that the virtual conference device is approaching. Especially when the geofence prohibits streaming or requires permission for streaming, the user can get a warning beforehand. The notification can also be an item of interest within the geofence. For example, at an exposition, the expo host may want to highlight certain activities or products in an area, a geofence can be configured to send a notification about the activity or product to attract users within a proximity of the area to come.

Thus, this example provides automatic control for video and audio streams of an event by using geofences for the event. The geofences can include control settings to virtual conference devices within the geofence. These control settings can be automatically executed on the virtual conference devices, for example, to disable camera and microphone, or to pop up a window for requesting permission. The event host can manage the virtual conference devices accurately and automatically by implementing rules via geofences. Meanwhile, geofences can guide the streaming or broadcasting of the event and assist users of virtual conference devices to follow the rules of the on-site event.

This illustrative example is given to introduce the reader to the general subject matter discussed herein and the disclosure is not limited to this example. The following sections describe various additional non-limiting examples and examples of virtual conferencing based on geofences.

Figure 1:
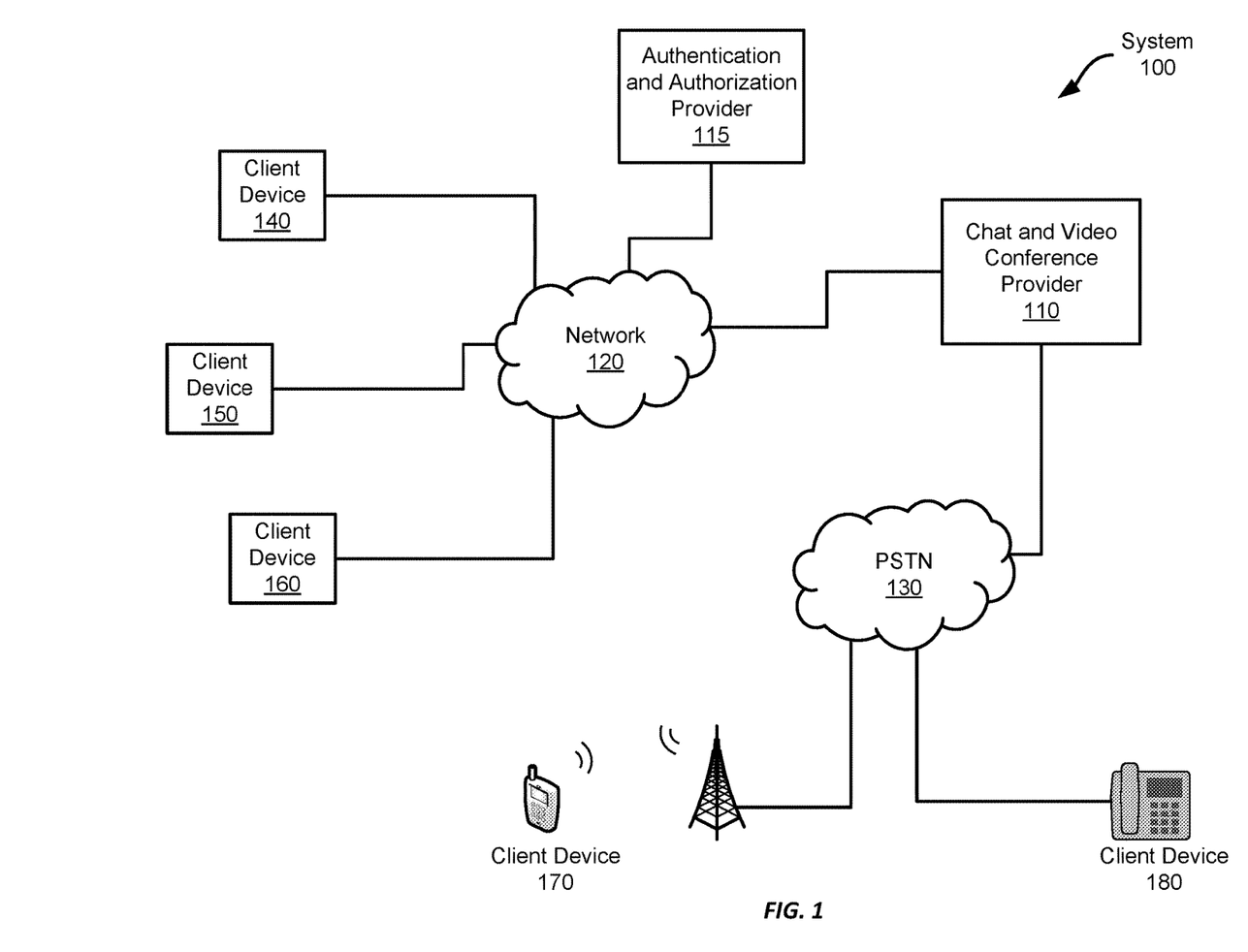
FIG. 1 shows an example system that provides videoconferencing functionality to various client devices.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
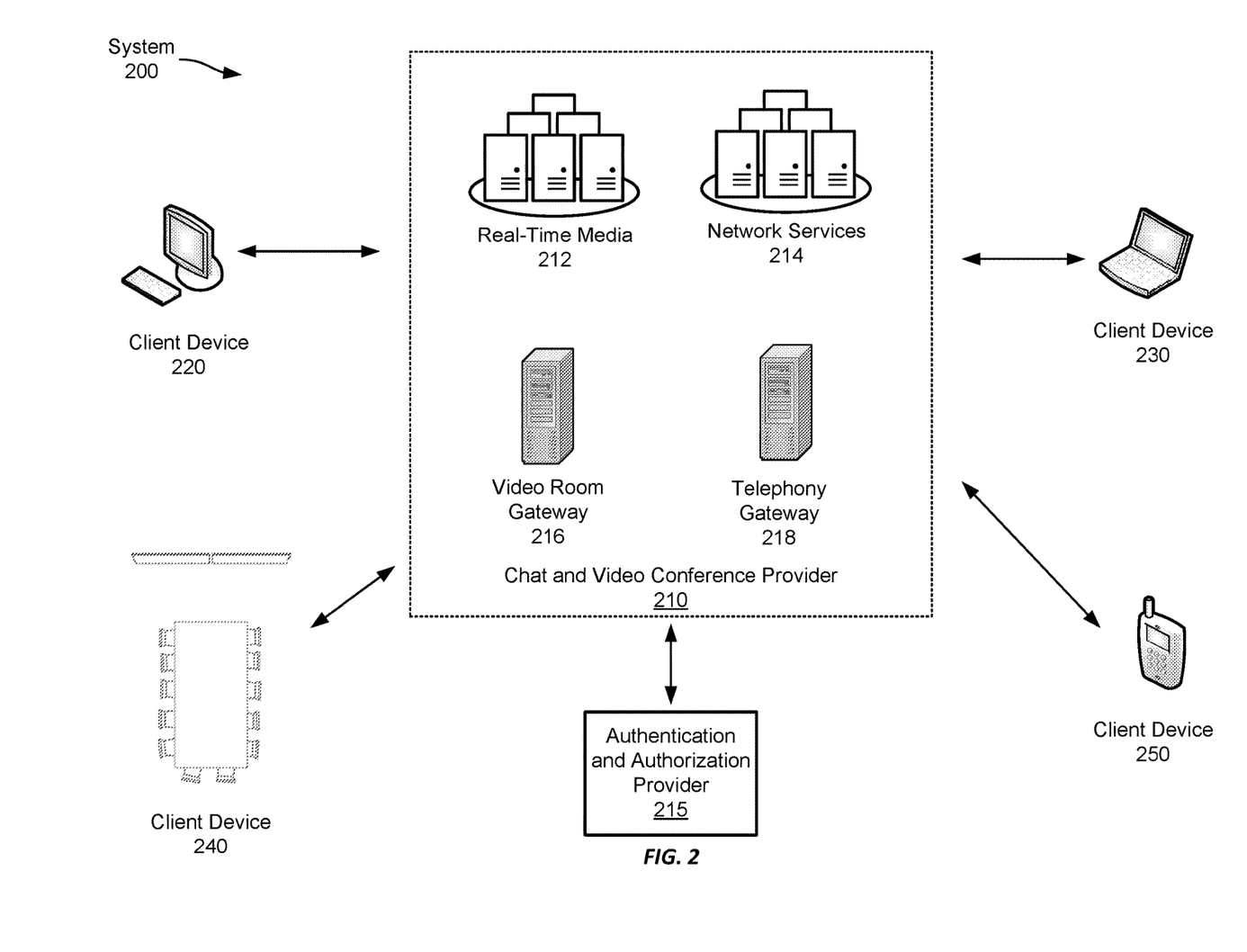
FIG. 2 shows an example system in which a video conference provider provides videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
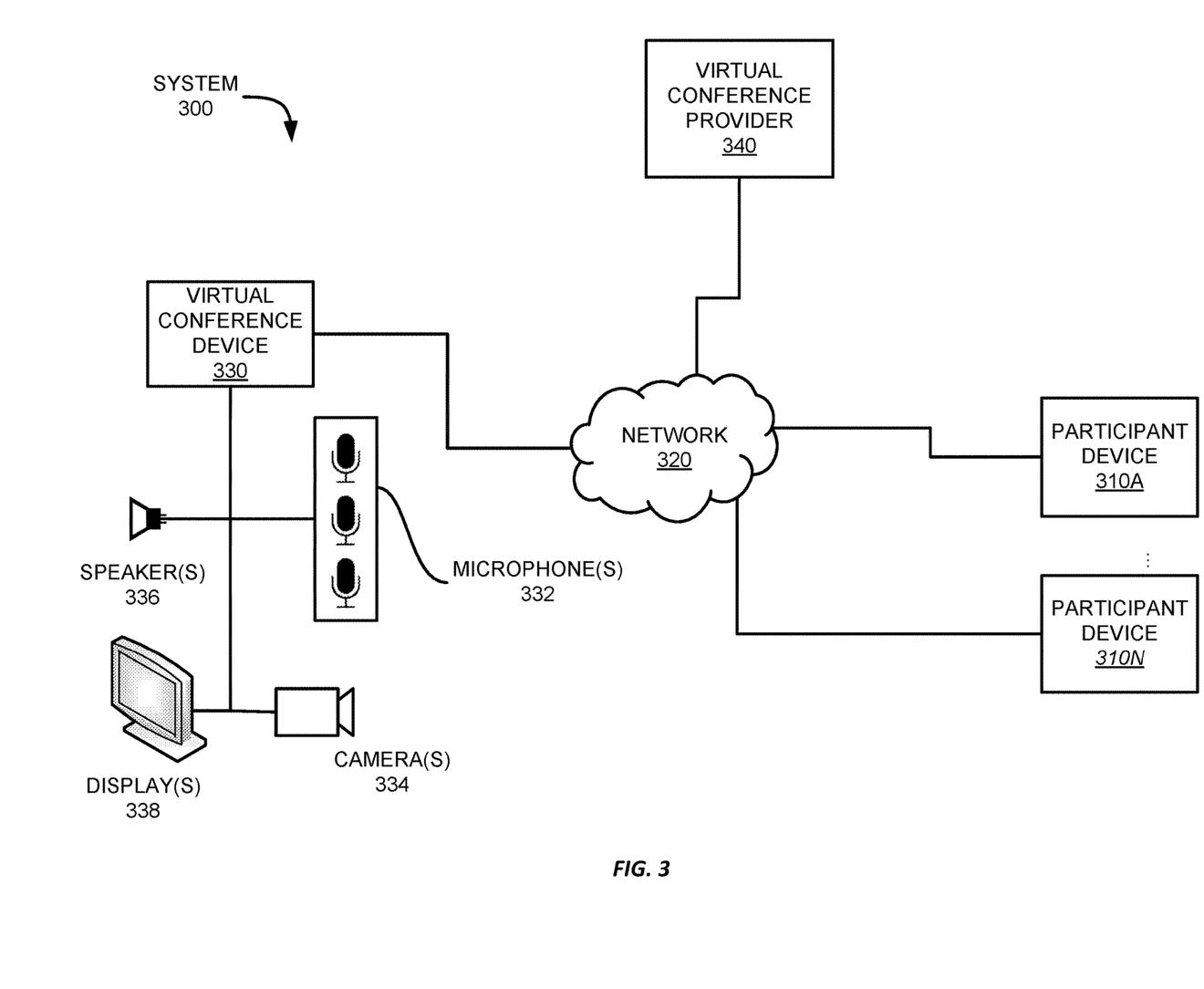
FIG. 3 shows an example system for creating a virtual conference.

Referring now to FIG. 3, FIG. 3 shows an example system 300 for creating a virtual conference. In this example system 300, a virtual conference device 330 and a number of participant device 310A-310N (which may be referred to herein individually as a client device 310 or collectively as the participant devices 310) are connected to a virtual conference provider 340 via a communications network 320. In this example, the network 320 is the internet, however, any suitable communications network or combination of communications network may be employed, including LANs (e.g., within a corporate private LAN) and WANs, similar to the network 120 illustrated in FIG. 1. The virtual conference provider 340 can be the chat and video conference provider 110 illustrated in FIG. 1 or chat and video conference provider 210 illustrated in FIG. 2. The participant devices 310 and the virtual conference device 330 can be client devices 140-160 illustrated in FIG. 1 or client devices 220-250 illustrated in FIG. 2.

In this example, the virtual conference device 330 operates as a client device. The virtual conference device 330 can be a presenter of a virtual conference. Alternatively, or additionally, the virtual conference device 330 can create a virtual conference to provide video streaming functionality for an on-site event. For examples, the virtual conference device 330 can establish an event session for the on-site event. The user associated with the virtual conference device 330 can be a host of the on-site event, or an on-site participant of the on-site event. The virtual conference device 330 in this example includes a computing device, microphone(s) 332, camera(s) 334, speaker device(s) 336, and display(s) 338. The microphone(s) 332, camera(s) 334, speaker device(s) 336, and display(s) 338 can be embedded in the virtual conference device 330, or separate devices connected to the virtual conference device 330. The virtual conference device 330 has a virtual conference application installed to connect the virtual conference device 330 to the virtual conference provider 340 and provide audio streams captured by microphone(s) 332 and video streams captured by camera(s) 334 for remote participants via the virtual conference provider 340. Similarly, each participant device 310 executes a virtual conference application, which connects to the virtual conference provider 340, to join a virtual session for the on-site event established by the virtual conference device 330. Each participant device 310 can also include microphones and cameras for transmitting audio and video streams to the virtual conference device 330. During the virtual session, the various remote participants, via their respective participant devices 310, are able to view the streaming of the on-site event.

The host of the on-site event can set up one or more geofences for streaming the on-site event on the virtual conference provider 340 via a host device (not shown). A geofence is a virtual geographic boundary that enables an application installed on a mobile device to trigger certain responses when the mobile device enters or leaves a particular area. The virtual geographic boundary can be defined by Global Positioning System (GPS), radio-frequency identification (RFID), cellular or Wi-Fi positioning, or other location technologies. The host device, similar to the virtual conference device 330 or participant devices 310, is installed with a virtual conference application. Even though the virtual conference applications installed on the virtual conference device 330, client devices 310, and the host device may be the same software, some functionalities that are available to one type of users may not be available to others based on their account settings. For examples, an event host can create and edit geofences for the on-site event, but the virtual conference application on the virtual conference devices or the client devices may not allow editing the geofences. However, when the user of the virtual conference device is an event host, the user can create or edit geofences for an event via the virtual conference device.

While a single event host is discussed with respect to this example, any number of users may be event co-hosts for creating geofences for streaming the on-site event. The virtual conference application may include a geofence module. Prior to the on-site event, the event host can select an option to create one or more geofences for the on-site event via the virtual conference application installed on the host device.

The geofence module may include a map. The event host can define a virtual boundary for an area at a location of the on-site event in the map and specify associated rules for entering or exiting the area. The virtual boundary of the area can be referred to as a geofence. The event host can define multiple geofences for different areas at the location of the on-site event. The geofences and the associated rules can be stored as geofence data about streaming the on-site event on the virtual conference provider 340. The geofence data can be accessible to a virtual conference device 330 that is permitted to stream the on-site event.

Figure 4:
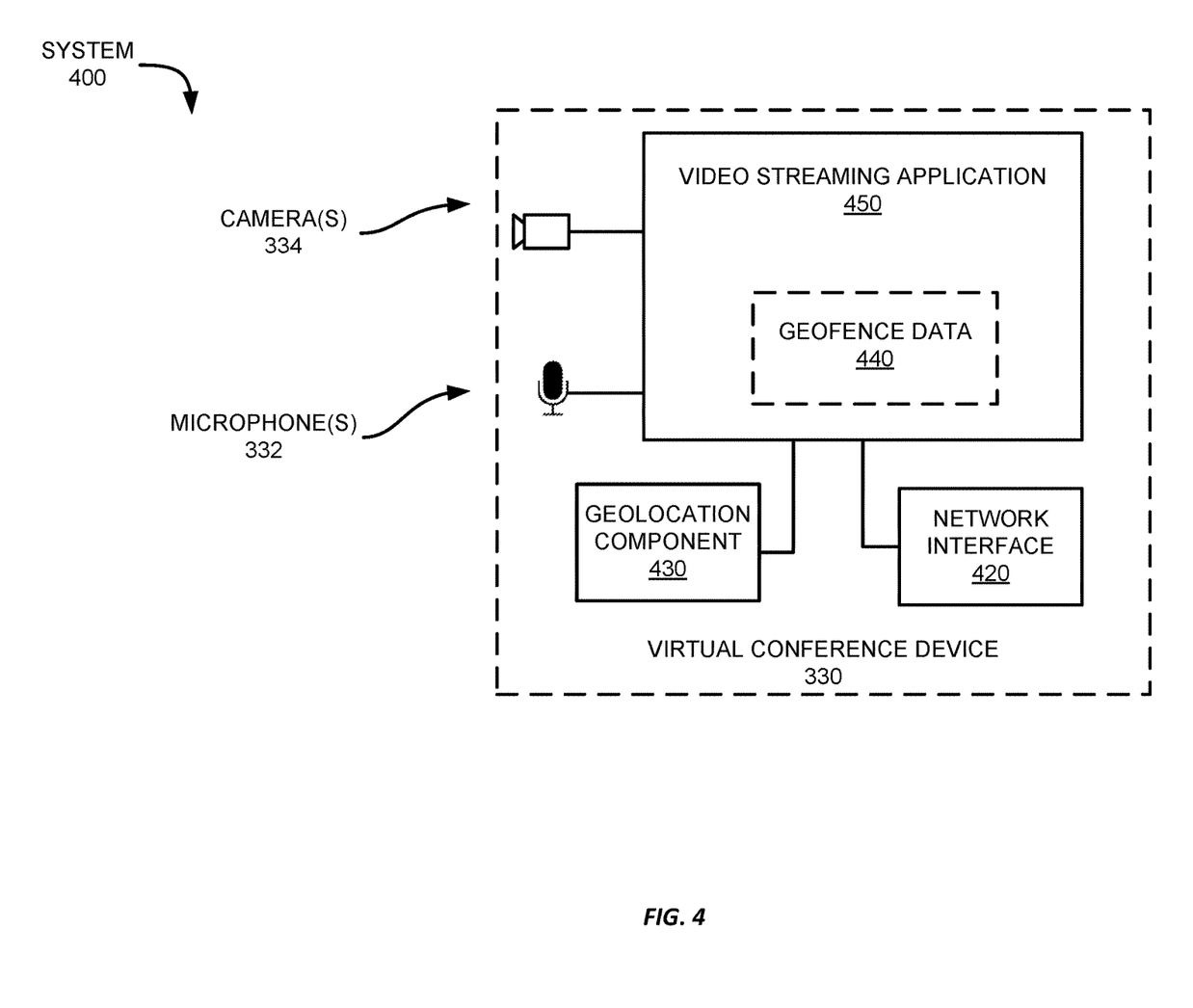
FIG. 4 shows an example virtual conference device configured to apply rules associated a geofence for an event.

Now referring to FIG. 4, FIG. 4 is an example virtual conference device 330 configured to apply rules associated with a geofence for an event. In some examples, the user of the virtual conference device 330 is a host of the event. In some examples, the user of the virtual conference device 330 is a participant of the event, streaming the event to remote participants with permission from the event host. There can be multiple virtual conference devices for streaming the event. The event can be an on-site event, but allowing virtual access for remote participants. Each virtual conference device 330 creates an event session for streaming the event. Even though the virtual conference devices 330 may not be at the same place and the event sessions may be different, all the virtual conference devices 330 can be controlled via the geofences and the associated rules set up by the event host, which can be referred to as geofence data 440.

In this example, the virtual conference device 330 includes microphone(s) 332 and camera(s) 334 for streaming an on-site event. The camera(s) 334 can include a front-facing camera and a rear-facing camera. In some examples, the virtual conference device 330 uses both the front-facing camera and the rear-facing camera for streaming. For example, the front-facing camera can stream the on-site event and the rear-facing camera can stream the facial reactions of the user of the virtual conference device 330.

The virtual conference device 330 also includes a geolocation component 430 configured to collect location data associated with the virtual conference device 330 and transmit to a virtual conference application 450 installed on the virtual conference device 330. The geolocation component 430 may collect location data based on different location technologies, for example GPS, RFID, Wi-Fi, near-field communication (NFC), Bluetooth.

The virtual conference application 450 of the virtual conference device 330 can retrieve geofence data 440 from the virtual conference provider 340 via the network interface 420. The geofence data 440 can be retrieved when the virtual conference device 330 is registered or logged in for establishing an event session. Alternatively, or additionally, the virtual conference application 450 installed on the virtual conference device 330 is triggered to receive corresponding geofence data 440 when the virtual conference device 330 is approaching or within a geofence based on the location data from the geolocation component 430. The virtual conference application 450 can execute rules associated with the geofence that the virtual conference device 330 is approaching or within the geofence.

For example, the virtual conference device 330 is approaching an area at the location of the event. The area is bounded with a geofence. The geofence is set up by the event host with associated rules. In some examples, the virtual conference provider 340 transmits a notification message to the virtual conference device 330 when a virtual conference device 330 is within a predetermined distance from the geofence. The notification message can include a list of restrictions or permissions for streaming within the geofence, such as allowing camera and microphone access, prohibiting camera and microphone access, or requesting permission about camera and microphone access. The notification message can also include an item of interest within the geofence. The item of interest can be a product or service that the event host wants to promote. The item of interest can also be a place that the event host wants to warn users of virtual conference devices to avoid. The notification message can either direct the virtual conference devices 330 to stay away from the geofenced area or attract the virtual conference device 330 to go to the geofenced area.

In some examples, different areas at the location of the event have different rules. Geofences for these different areas can be set up with corresponding rules. The rules associated with a geofence can include permissions to access camera and microphone or not, and background and sound effect for video and audio streams within the geofence. For example, a geofence A for area A allows camera and microphone access within the geofenced area, and the rules also include certain background settings, sound effect settings, or other setting for streaming. For instance, within the geofenced area A is a Disney® event, the event host specifies that all virtual conference devices within geofenced area A displays a Disney logo and plays a Disney® music while video conferencing. Therefore, when a virtual conference device 330 enters the geofence area A, camera and microphone are enabled for conferencing. The virtual conference application 450 executes other settings correspondingly to insert a Disney® logo in the video stream and play a Disney® music in the audio stream. In addition, the rules associated with geofence A can also include rules for blocking camera and microphone access outside the geofenced area. When the virtual conference device 330 is outside the geofenced area, the virtual conference application 450 installed on the virtual conference device 330 or any client device cannot access camera or microphone. The rules associated with the geofence can also include transmitting an alert message to the event host via the virtual conference provider 340 when a virtual conference device 330 enters or leaves the geofenced area A. So that the event host can keep track what virtual conference device is within the geofenced area.

As another example, a geofence for area B prohibits camera and microphone within the geofence. When the virtual conference device 330 is within the geofenced area B, the cameras 334 are disabled for video streaming and the microphone 332 is disabled for audio streaming. The streaming background may become black, display a preset image, or play a preset video clip based on the specific settings. In addition, the rules associated with geofence B can also include rules for allowing camera and microphone access outside the geofenced area. When the virtual conference device 330 or any client device is outside the geofenced area, the virtual conference application installed on the virtual conference device 330 or any client device can access camera and microphone. The rules associated with the geofence can also include transmitting an alert message to the event host when a virtual conference device 330 enters or leaves the geofenced area B.

Yet as another example, a geofence for area C requires permission from the event host for access to camera and microphone. When the virtual conference device 330 is within the geofenced area C, a dialog window is popped up to ask the user of the virtual conference device 330 to provide name, code, or other verification or authorization information. If the user of the virtual conference device 330 receives permission after providing the information, the virtual conference application 450 installed on the virtual conference device 330 can access camera and microphone of the virtual conference device 330, and also apply other settings related to streaming, similar to the geofenced area A. If the user of the virtual conference device does not receive permission after providing the information, the camera and microphone of the virtual conference device 330 is disabled, and other settings related to prohibiting streaming can be implemented, similar to the geofenced area B. In addition, the rules associated with geofence C can also include rules for allowing or blocking camera and microphone access outside the geofenced area. When the virtual conference device 330 or any client device is outside the geofenced area, the virtual conference application 450 installed on the virtual conference device 330 or any client device can access camera and microphone or not, based on specific rules. rules associated with the geofence can also include transmitting an alert message to the event host when a virtual conference device 330 enters or leaves the geofenced area C.

In some examples, rules associated with a geofence are about recording the video and audio streams. The recording rules can be similar to streaming rules. For example, if a geofence prohibits access to camera and microphone for streaming within the geofence, it may also prohibit recording. The recording rules can also be different from streaming rules. For example, a geofence allows for access to camera and microphone for streaming within the geofence but prohibits recording of the video and audio streams.

In some examples, a geofenced area includes one or more geofenced subareas. That is, one or more inner geofences can be within an outer geofence. The geofenced area is bound by an outer geofence with associated rules. Each inner geofence also have their associated rules for corresponding subareas. For example, within the outer geofence, a virtual conference device is prohibited to access camera or microphone. However, in some subareas, a virtual conference device can request for permission to access camera or microphone; in some subareas, a virtual conference device is allowed to access camera or microphone for presenting or streaming.

In some examples, the user of the virtual conference device 330 is the event host or a presenter, the user can define geofences and specify certain rules about using camera or microphone at the user's location during the event session even when the event is a virtual event. For example, the user can create a geofence in the office room allowing camera and microphone, and a geofence in the family room and bathrooms prohibiting camera and microphone. Then when the user of the virtual conference device goes to the family room or the bathroom, the camera and microphone can be disabled automatically based on corresponding rules associated with the geofences for these areas.

Figure 5:
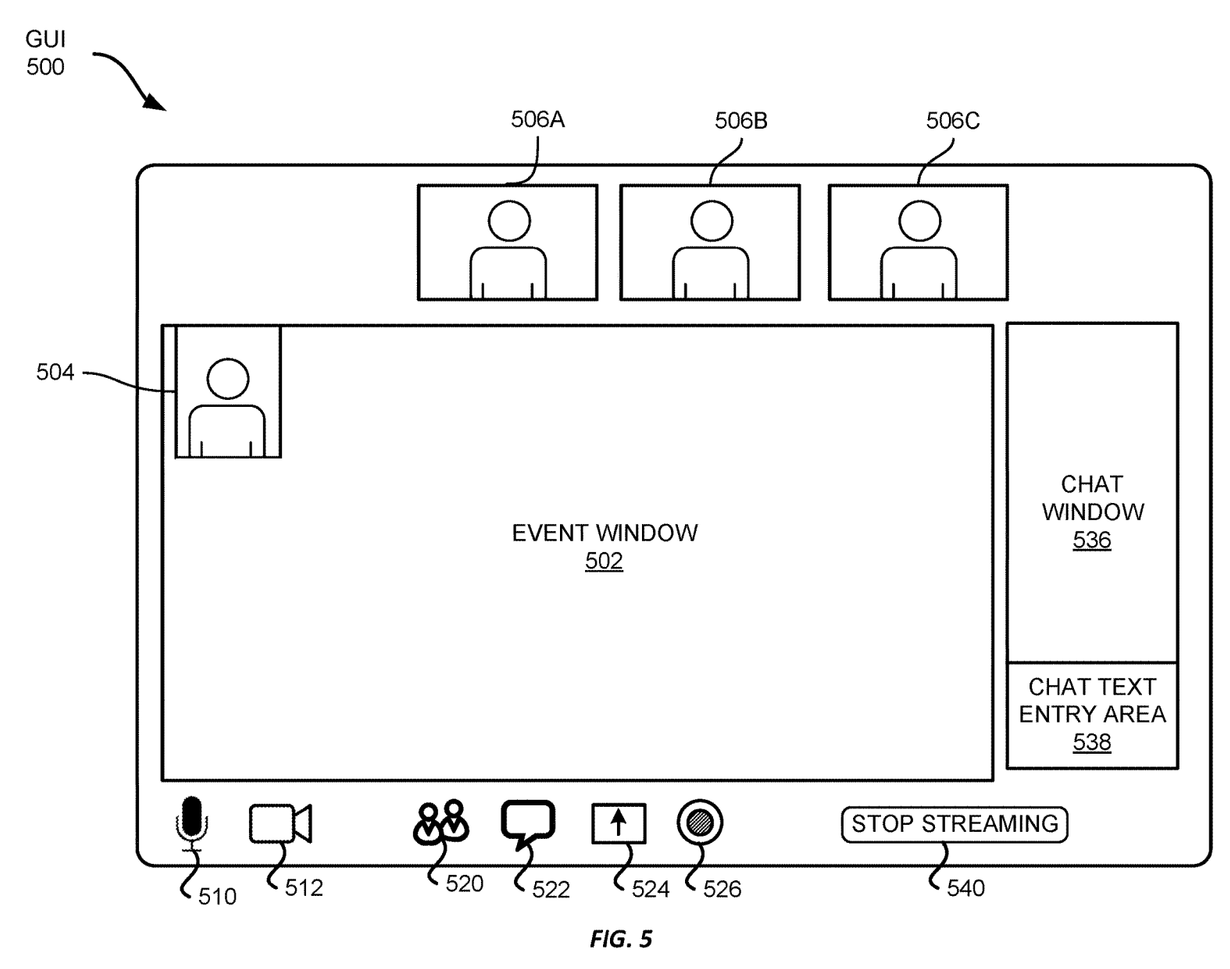
FIG. 5 shows an example GUI for an event session.

Referring now to FIG. 5, FIG. 5 shows an example GUI 500 for an event session. A virtual conference device, e.g., virtual conference device 330, executes virtual conference software, e.g., virtual conference application 450, to start an event session. The GUI 500 of the event session is displayed on the virtual conference device's display, e.g., display(s) 338. In this example, the GUI 500 includes an event window 502 that presents the video streams of the event from a front facing camera 334 of the virtual conference device 330. All of the participants of the event session are shown in participant windows 506 above the event window 502. In this example, three participants have joined the event session, who are displayed in participant windows 506A-506C. In addition, the GUI 500 also includes a local user window 504 to display the face of the user of the virtual conference device. The local user window 504 can be at the corner of the event window 502, as shown in FIG. 5. Alternatively, the local user window 504 can be displayed outside the event window 502. The user of the virtual conference device can elect to enable or disable the rear-facing camera and the local user window 504. If enabled, the participants of the event session can not only see the video stream of the event in the event window 502 but also see the reactions of the user of the virtual conference device in the local user window 504. It enhances the virtual interactive experiences for remote participants.

Beneath the event window 502 are a number of interactive elements 510-528 to allow the user of the virtual conference device to interact with the virtual conference application 450. Controls 510-512 may allow the user of the virtual conference device to toggle on or off audio or video streams captured by a microphone 332 or camera 334 connected to the virtual conference device 330. Control 520 allows the user of the virtual conference device to view a list of remote participants in the streaming session, while control 522 allows the user of the virtual conference device to send text messages to the remote participants. Control 524 allows the user of the virtual conference device to share content from the virtual conference device 330. Control 526 allows the user of the virtual conference device to toggle recording of the streaming session. The GUI also includes a chat window 536 and chat text entry area 538, which may be toggled by control 522, to allow the participants to exchange text messages. Control 540 allows the participant to stop the event session.

Figure 6:
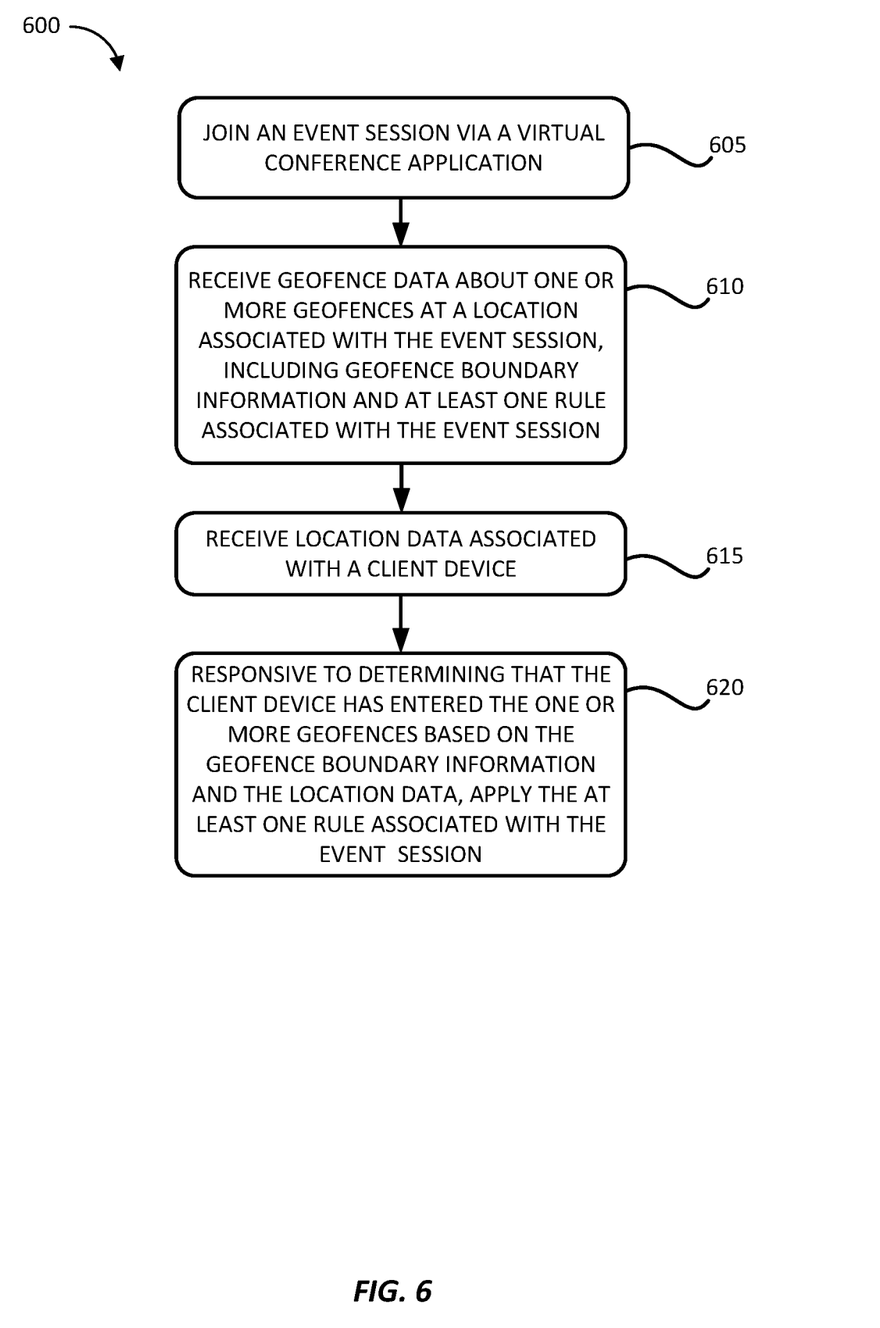
FIG. 6 shows an example method for virtual conferencing based on geofences.

Referring now to FIG. 6, FIG. 6 shows an example method 600 for virtual conferencing based on geofences. The method 600 of FIG. 6 will be described with respect to the system 300 shown in FIG. 3 and the system 400 shown in FIG. 4; however, any suitable system according to this disclosure may be employed.

At block 605, a client device joins an event session associated with an event via a virtual conference application. The client device can be a virtual conference device 330 presenting in the event session. The virtual conference device 330 can be associated with a host of the event or a participant of the event. In some examples, the event session is a streaming session that the virtual conference device 330 transmits video and audio streams to the participant devices 310. The streaming session can be for remote participants who cannot be in person for an on-site event. The virtual conference device 330 may need to be authorized for streaming the event in general, for example at the registration. In some examples, the event session is a video conference that the user of the virtual conference device joins to present to other participants. In addition, some areas at the location of the event may be geofenced with specific rules for devices within the geofence.

At block 610, the client device receives geofence data about one or more geofences at a location associated with the event session. The geofence data 440 can include the geofence boundary information and rules within the geofence. The rules within the geofence can include at least one rule about accessing camera and microphone within the geofence. Following the example above, the at least one rule can be to allow streaming, prohibit streaming, or request permission for streaming within the geofence. The at least one rule can also include background settings, audio effect setting, and other suitable settings about streaming the event session within the geofence.

An event host can create the event, which can include an on-site component and also provide virtual access, on the virtual conference provider 340. The event host can define the boundaries of the one or more geofences at the on-site location of the event. Further, the event host can specify certain rules within the one or more geofences associated with the virtual access. The geofence data 440, including geofence boundary information and the rules within the one or more geofences, can be stored on the virtual conference provider 340. The virtual conference application 450 can access and retrieve the geofence data 440 from the virtual conference provider 340. The geofence data 440 can be downloaded to the virtual conference device 330 when the virtual conference device 330 is registered for streaming the or when the virtual conference device 330 starts to establish a virtual event session for the event at the location.

At block 615, the client device receives location data of the client device. The virtual conference device 330 includes a geolocation component 430 configured to collect or generate location data of the virtual conference device 330. The geolocation component can determine a location of the virtual conference device based on different location technologies, for example GPS, RFID, cellular, Wi-Fi, NFC, Bluetooth, etc. The virtual conference application 450 can access the location data from the geolocation component 430.

At block 620, responsive to determining that a client device has entered the one or more geofences based on the geofence boundary information and the location data, the client device applies the at least one rule associated with the event session. The virtual conference application 450 installed on the virtual conference device 330 may determine whether the virtual conference device 330 has entered a geofence based on the location data of the virtual conference device 330 and the boundary data of the geofence. In some examples, some rules associated with the geofence triggers when the virtual conference device 330 is within the geofence. If the virtual conference device 330 is not within any geofence, the rules associated with the geofence may not be triggered. In some examples, some rules associated with the geofence triggers when the virtual conference device 330 is approaching the geofence. Yet in some examples, some rules associated with the geofence triggers when the virtual conference device 330 is leaving the geofence.

The virtual conference application 450 installed on the virtual conference device 330 can be configured to execute the rules. The rules can include at least one setting about streaming the event session. In some examples, a setting about streaming the event session is to allow streaming, and additional associated settings are background settings, sound effect settings, or other settings for streaming the event session. In some examples, a setting about streaming the event session is to prohibit streaming. The virtual conference application 450 can disable cameras 334 and microphones 332 on the virtual conference device 330 when the virtual conference device 330 is within the geofence. Meanwhile, some additional associated settings may be a specific background or sound when the live streaming is prohibited. In some examples, a setting about streaming the event session is to request permission from the event host. A dialogue window may be popped up in a GUI on the virtual conference device 330, requesting names, code, or other verification or authorization information.

In some examples, the virtual conference provider 340 may generate and transmit notification messages to a virtual conference device 330 within a predetermined distance from a geofenced area via the virtual conference application 450 installed on virtual conference device 330. The virtual conference application 450 can detect that the virtual conference device 330 is within the predetermined distance from a geofenced area based on the location data of the virtual conference device 330 and the boundary data of the geofence. The notification message can include rules within the geofence. For example, the message warns the user of the virtual conference device 330 that streaming is prohibited once the virtual conference device 330 is within the boundary of the geofence. The message can also include information about an item of interest within the geofence area or any other suitable information about the geofenced area that the event host wants the user of the virtual conference device 330 to know. Alternatively, or additionally, a second geofence can be set up for the area within the predetermined distance from an area that is bound by a first geofence. These notification settings can be part of the rules within the second geofence.

In some examples, the virtual conference device 330 receives a notification message when it enters a geofence and the rules about camera and microphone are executed. A notification message can also be sent to the event host notifying the event host a virtual conference device 330 has entered which geofence. Similar to approaching a geofence, when the virtual conference device 330 is leaving the geofence, it can receive a notification message notifying the user of the virtual conference device 330 that the user is leaving the geofence. When the virtual conference device 330 has left the geofence, it can receive another notification message that the virtual conference device 330 is outside the geofence and the rules within the geofence are unapplied.

For example, a rule associated with a geofence prohibits streaming within the geofence. When a virtual conference device 330 is approaching the geofence, it receives a notification message notifying the user associated with the virtual conference device 330 of the rule within the geofence for prohibiting streaming. Once the virtual conference device 330 has entered the geofence, the rule about prohibiting streaming is applied and the virtual conference device 330 cannot access camera or microphone. Meanwhile, the virtual conference device 330 receives a notification message about the application of the rule and the event host receives a notification message that the virtual conference device 330 is within the geofence. When the virtual conference device 330 is moving toward the boundary of the geofence, it receives a notification message notifying the user associated with the virtual conference device 330 that the user is about to leave the geofence. When the virtual conference device 330 has left the geofence, the rule about prohibiting streaming is withdrawn and the virtual conference device 330 can access the camera and microphone again (as long as the area outside the geofence does not have another geofence for prohibiting access to camera and microphone). Meanwhile, the virtual conference device 330 receives a notification message notifying the user that prohibition rule is lifted. The event host can receive a notification message as well about the virtual conference device 330 not being within the geofence.

The user of the virtual conference device 330 may also record the streaming. Geofences at the location of the event may have recording rules similar to the streaming rules. For example, if streaming is prohibited within a geofence, recording is also prohibited. As another example, if streaming requires permission from an event host, then recording also requires permission from the event host. However, in some examples, the recording rules may be different from streaming. For example, streaming is allowed within a geofence, but recording may be prohibited. The virtual conference application 450 can disable the recording control button 526 in the GUI 500 in FIG. 5, but enable the camera 512 and the microphone 510 for streaming.

There can be additional settings for recording. For example, in a geofenced area where recording is enabled, the event host may include settings to snapshot or screen-grab images or video clips from the recorded streaming of an on-site event and the facial expressions of the user of the virtual conference device 330. The event host may need to ask permission from the user of the virtual conference device via a popup window in the GUI during the streaming of the event or via signed agreements or other means prior to the event. The requested permission may be related to using the images or video clips from the recorded streaming for different purposes, for example marketing or selling.

Figure 7:
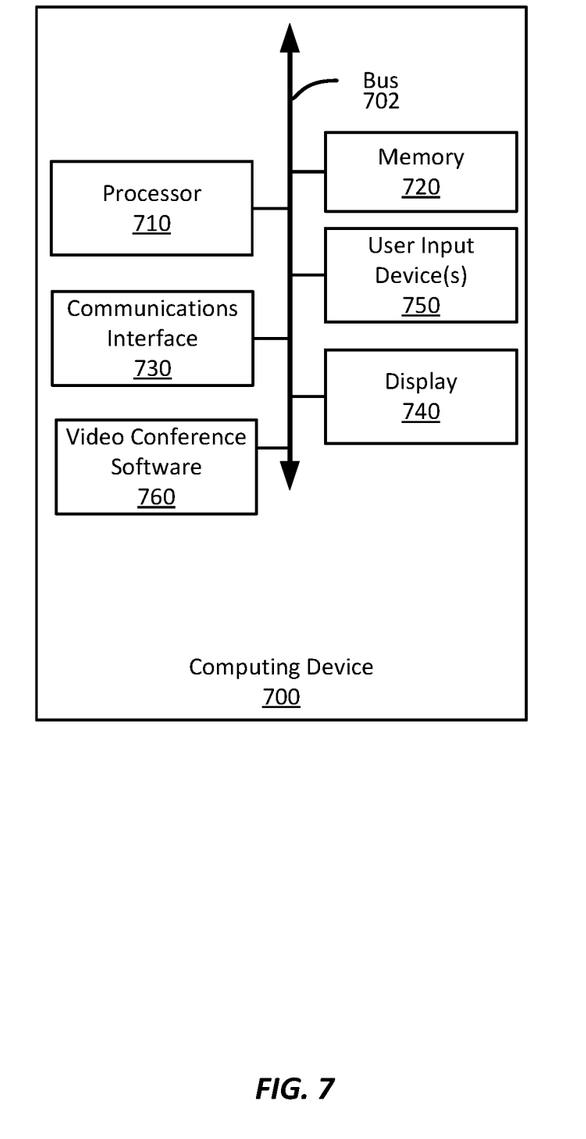
FIG. 7 shows an example computing device suitable for use with example systems and methods for virtual conferencing based on geofences.

Referring now to FIG. 7, FIG. 7 shows an example computing device 700 suitable for use in example systems or methods for virtual conferencing based on geofences according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for virtual conferencing based on geofences according to different examples, such as part or all of the example method 600 described above with respect to FIG. 6. In some embodiments, the computing device may include virtual conference software 760 for executing one or more methods described herein, such as for example, one or more steps of method 600. The computing device 700, in this example, also includes one or more user input devices 750, such as a keyboard, mouse, touchscreen, microphone, etc., to accept user input. The computing device 700 also includes a display 740 to provide visual output to a user.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   streaming, by a client device, an event session via a virtual conference application;
   receiving, by the client device, geofence data about one or more geofences at a location associated with the event session, the geofence data comprising geofence boundary information and at least one rule associated with streaming the event session;
   receiving, by the client device, location data associated with the client device;
   determining that the client device has entered the one or more geofences based on the geofence boundary information and location data of the client device; and
   executing, by the client device, the at least one rule associated with streaming the event session to control one or more media components associated with the client device for streaming the event session.

2. The method of claim 1, wherein the at least one rule comprises a setting of allowing the virtual conference application for access to camera and microphone of the client device within the one or more geofences.

3. The method of claim 1, wherein the at least one rule comprises a setting of denying the virtual conference application for access to camera and microphone of the client device within the one or more geofences.

4. The method of claim 1, wherein the at least one rule comprises a setting of requiring a permission for accessing camera and microphone of the client device within the one or more geofences, wherein applying the at least one rule comprises causing a request window to be displayed on the client device, wherein the client device is configured to transmit a request via the request window.

5. The method of claim 1, wherein the at least one rule comprises a background setting or a sound effect setting for the client device during the event session within the one or more geofences.

6. The method of claim 1, further comprising receiving a notification when the client device is approaching the one or more geofences.

7. The method of claim 6, wherein the notification comprises the at least one rule associated with the event session within the one or more geofences.

8. The method of claim 6, wherein the notification comprises information about an item of interest within the one or more geofences.

9. The method of claim 1, further comprising receiving a notification when the client device is leaving the one or more geofences.

10. The method of claim 1, wherein the at least one rule comprises a setting for allowing or prohibiting recording of the event session by the client device.

11. A system comprising:
    a communications interface;
    a non-transitory computer-readable medium; and
    one or more processors communicatively coupled to the communications interface and the non-transitory computer-readable medium, the one or more processors configured to execute processor-executable instructions stored in the non-transitory computer-readable medium to:
    stream an event session;
    receive geofence data about one or more geofences at a location associated with the event session, the geofence data comprising geofence boundary information and at least one rule associated with streaming the event session;
    receive location data associated with a client device;
    determine that the client device has entered the one or more geofences based on the geofence boundary information and location data of the client device; and
    execute the at least one rule associated with streaming the event session to control one or more media components associated with the client device for streaming the event session.

12. The system of claim 11, wherein the at least one rule comprises a setting of allowing access to camera and microphone of the client device within the one or more geofences.

13. The system of claim 11, wherein the at least one rule comprises a setting of denying access to camera and microphone of the client device within the one or more geofences.

14. The system of claim 11, wherein the at least one rule comprises a setting of requiring a permission for accessing camera and microphone of the client device within the one or more geofences, wherein applying the at least one rule comprises causing a request window to be displayed on the client device, wherein the client device is configured to transmit a request via the request window.

15. The system of claim 11, wherein the at least one rule comprises a background setting or a sound effect setting for the client device during the event session within the one or more geofences.

16. The system of claim 11, wherein the one or more processors are configured to execute further processor-executable instructions stored in the non-transitory computer-readable medium to:
receive a notification when the client device is approaching the one or more geofences, wherein the notification comprises the at least one rule associated with the event session within the one or more geofences or information about an item of interest within the one or more geofences.

17. The system of claim 11, wherein the one or more processors are configured to execute further processor-executable instructions stored in the non-transitory computer-readable medium to:
receive a notification when the client device is leaving the one or more geofences.

18. A non-transitory computer-readable medium comprising processor-executable instructions configured to cause one or more processors to:
stream an event session;
receive geofence data about one or more geofences at a location associated with the event session, the geofence data comprising geofence boundary information and at least one rule associated with streaming the event session;
receive location data associated with a client device;
determine that the client device has entered the one or more geofences based on the geofence boundary information and location data of the client device; and
execute the at least one rule associated with streaming the event session to control one or more media components associated with the client device for streaming the event session.

19. The non-transitory computer-readable medium of claim 18, further comprising processor-executable instructions configured to cause one or more processors to:
receive a notification when the client device is approaching the one or more geofences, wherein the notification comprises the at least one rule associated with session within the one or more geofences or information about an item of interest within the one or more geofences.

20. The non-transitory computer-readable medium of claim 18, further comprising processor-executable instructions configured to cause one or more processors to:
receive a notification when the client device is leaving the one or more geofences.

* * * * *